June 13, 1961 C. R. CORPEW 2,988,660

ELECTRO OPTICAL SYSTEM IN A CATHODE RAY TUBE

Filed July 2, 1958

INVENTOR.
CHARLES R. CORPEW.

BY Carl R. Brown

AGENT.

2,988,660
Patented June 13, 1961

2,988,660

ELECTRO OPTICAL SYSTEM IN A CATHODE RAY TUBE

Charles R. Corpew, San Diego, Calif., assignor to General Dynamics Corporation, Rochester, N.Y., a corporation of Delaware Filed July 2, 1958, Ser. No. 746,158
5 Claims. (Cl. 313—86)

This invention relates to an improved electro optical system in a cathode ray tube and more particularly to the use of focusing lenses for reducing the cross sectional dimension of an electron beam at the centers of its deflection.

In using electrostatic deflection plates to deflect an electron beam in a cathode ray tube, distortion to the shape of the electron beam may be caused by the action of the field between the plates in deflecting the beam. This distortion normally increases with an increase in the cross sectional area of the electron beam presented to the particular field. Accordingly, the larger the cross sectional area of the beam presented to the field relative to the direction of its deflection, the greater the distortion and conversely the smaller the cross sectional area presented to the field, the smaller the distortion. This distortion is encountered regardless of the configuration of the electron beam and therefore is present in all types of cathode ray tubes to the degree determined by the cross sectional area of the beam and the amount of beam deflection desired. In certain types of cathode ray tubes, such as the shaped beam cathode ray tube disclosed in the specific embodiment, the effect of this distortion is particularly detrimental. The shaped electron beam, of necessity, must have a relatively large cross section inasmuch as it is shaped in the image of a character, and any distortion to the beam will be particularly detrimental as it will adversely effect the shape of the character imaged on the screen of the tube.

It has been found that reducing the dimension of the electron beam that lies parallel to the direction of deflection of the beam by the field of a single pair of electrostatic plates, will reduce to a minimum distortion of the beam resulting from its deflection. However, electrostatic deflection units generally used in cathode ray tubes comprise two pairs of deflection plates that are spaced from each other and are positioned in quadrature to provide the required horizontal and vertical deflection to the beam. Therefore, the problem of narrowing the cross section of the beam for both sets of plates is presented.

The invention provides an optical system capable of presenting to each pair of deflection plates an electron beam having a minimum dimension in the direction of deflection of the respective plates. A pair of focusing lenses function to focus the beam to a point in one dimension or the X dimension for one pair of plates and in the other dimension or Y dimension for the other pair of plates. This permits the electron beam to be deflected by each pair of plates at its point of minimum dimension and thereby be deflected to the screen with a minimum of distortion while retaining clear definition of its previous configuration.

Electrostatic deflection plates are normally displaced in pairs in a manner that the electron beam encounters either the horizontal or vertical pair of deflection plates sequentially in its path toward the screen. Each of the focusing lenses primarily focuses the electron beam in only one dimension. Through this focusing action, the paths of the individual electrons in the beam are focused to a point in a given plane over at the respective points of deflection. Therefore, the aforesaid action requires that the electron beam receive different degrees of focusing in the respective X or Y dimensions. These different degrees of focusing cause the electron beam's image on the tube screen to be larger in one dimension than in the other. The dimension first receiving the focusing effect will have the larger dimension on the screen. In many applications of cathode ray tubes, this enlarging of one dimension presents no particular problem since the beam's image is not magnified on the tube screen by the electron optics of the tube. In these tubes the distortion of the beam by the electrostatic deflection is the more pressing problem. However, in shaped beam cathode ray tubes, the enlarging of one dimension of the character image on the screen can be very detrimental inasmuch as it changes the characters aspect ratio. This effect may be compensated for in shaped beam tubes by making the aforesaid dimension smaller in the shaping matrix or making the other dimension larger. Accordingly, in the present invention, the shaped beam can be deflected by the electrostatic plates to a particular position on the screen with its correct dimensions imaged thereon and with substantially no distortion due to the deflecting fields.

In addition to any objects and advantages aforesaid, it is an object of the present invention to facilitate the use of electrostatic deflection plates without imparting distortion to the electron beam from the deflecting fields.

Another object of the invention is to provide an image on the screen of a shaped beam cathode ray tube having correct dimensions even though the electron beam receives separate focusing in its travel to the screen.

Another object of the invention is to provide points of smallest dimension of the electron beam at the points of deflection of the electron beam.

Another object of the invention is to provide points of smallest dimension of the electron beam at the points of deflection of the electron beam.

Objects and advantages other than those set forth above will become apparent when read in connection with the accompanying specification and drawings, in which.

Figures 1, 2, 3:
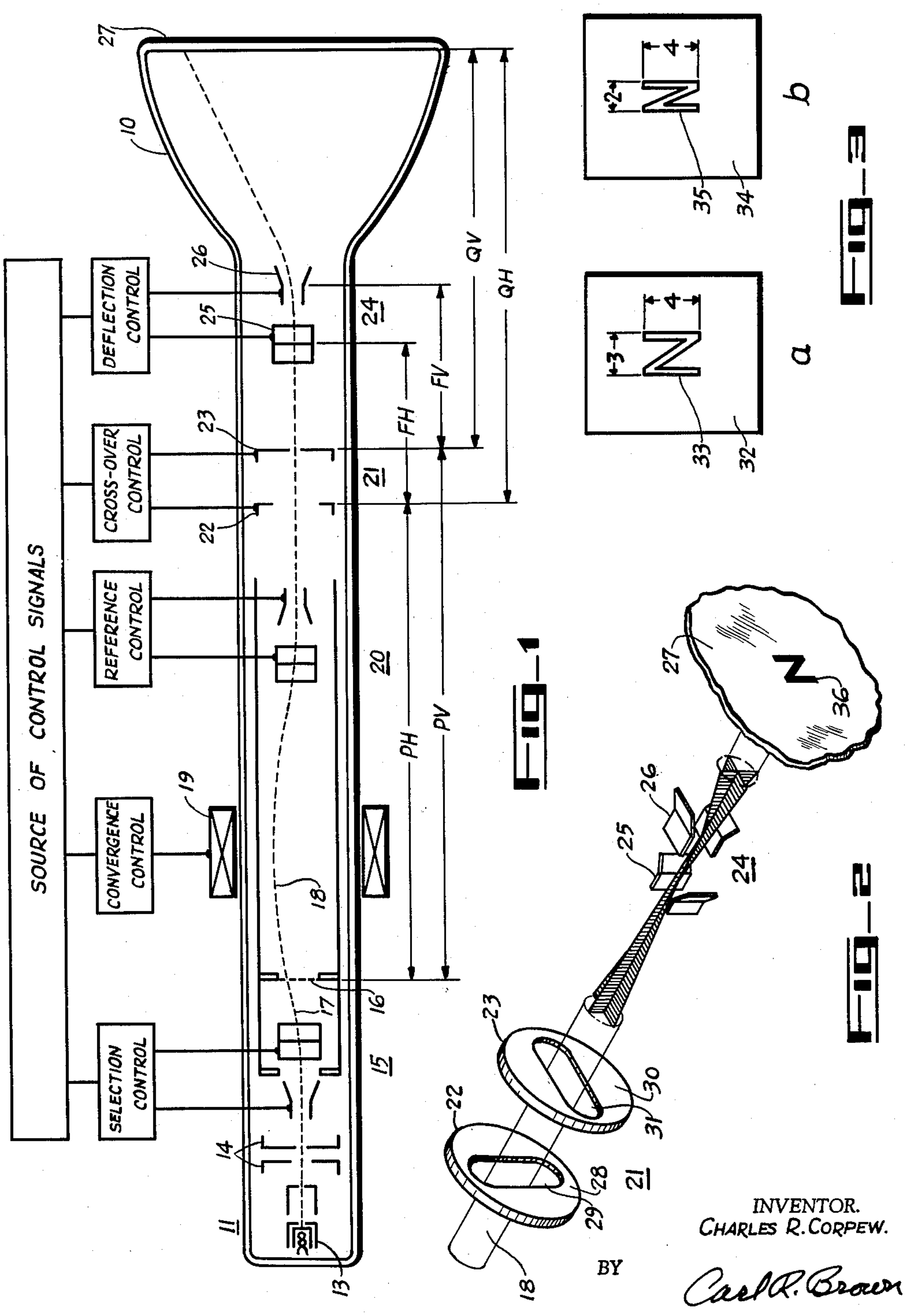
FIGURE 1 is a schematic view of a shaped beam cathode ray tube embodying the instant invention.
FIGURE 2 is a perspective view of the operation of the focusing lenses in reducing the respective dimensions of the electron beam in a shaped beam cathode ray tube.

FIGURE 3*a* illustrates a beam shaping matrix having the correct character aspect ratio for use in a shaped beam cathode ray tube.

FIGURE 3*b* illustrates a beam shaping matrix having one of the dimensions of the character apertures reduced in size to give the correct aspect ratio to the character imaged on the screen when using the focusing lenses.

Shown in FIGURE 1 is a shaped beam cathode ray tube having an evacuated envelope 10. Positioned at one end of the envelope 10 is a beam generating and projecting means 11 capable of projecting an electron beam 17 and 18 substantially along the longitudinal axis of the tube 10. A conventional electron generating cathode 13, along with desired accelerating and focusing anodes 14, may be included in the beam generating means 11. A target 27, such as a phosphor screen or like electro-responsive screen may be positioned at the other end of the tube 10 for electron to light conversion of the information to be displayed by a shaped beam 18.

In brief, the operation of the tube is as follows. An electron beam 17 is projected by beam generating means 11 to electrostatic selection plates 15, which select the character in matrix 16 the beam will contact causing a distinctively shaped beam 18. The path of travel of shaped beam 18 is redirected by convergence coil 19 toward a path substantially along the longitudinal axis of the tube. Referencing plates 20 receive the beam from the convergence coil 19 and further redirect the shaped beam 18 along the longitudinal axis. Final deflection plates 24 receive the shaped beam 18 from focusing lenses 21 and deflect the shaped beam 18 to a particular position on the screen of the tube. The focusing lenses 21 comprise a pair of electrostatic or magnetic focusing lenses 22 and 23 for operation with the horizontal 25 and vertical 26 pairs of electrostatic deflection plates. The lenses 21 are capable of focusing the beam in separate planes at separate points along the longitudinal axis of the tube. In operation, the lenses 21 separately focus to a point the beam 18 in a horizontal plane and a vertical plane at points on the axis coinciding respectively with the centers of horizontal and vertical deflection of the beam by deflecting plates 24. As a result, the shaped beam 18 will suffer a reduced deflection distortion since the beam 18 will have its smallest dimension in the direction of deflection at the center of deflection for both the centers of deflection.

In a more detailed description of the invention with reference to FIGURE 1, the electron beam 17 may be shaped into a predetermined character cross section or configuration by a beam shaping member 16 positioned along the axis intermediate target 27 and beam generating means 11, resulting in the shaped beam 18. Shaped electron beam 18 acquires the cross sectional shape imparted to the beam 18 by a stencil-like opening in the beam shaping member 16. In normal applications of shaped beam tubes, the character openings in the matrix have the same aspect ratio as the character images displayed on the screen of the tube. The term "aspect ratio" designates the X—Y dimensions of the character image and for normal displays the desirable aspect ratio is 3 to 4. (See FIGURE 3*a*.) This means that the horizontal character dimension is 3 and the vertical dimension is 4. The normal aspect ratio of the character display may be varied by changing the ratio of the horizontal and vertical dimensions of the character aperture in the matrix.

The selection deflection means 15, which may be electrostatic or electromagnetic, is capable of deflecting beam 16 to the desired character aperture in matrix 18. Convergence means 19, which may be of an electrostatic or electromagnetic construction, is shown in the instant exemplification as electromagnetic and is utilized to effect a converging of the divergent electron beam 18 to the longitudinal axis of the tube. Referencing means 20 consists of electrostatic or electromagnetic deflection means, and is shown as electrostatic, serves to direct the electron beam in a path coincidental with the longitudinal axis of the tube.

The final deflection means 24 comprises two pairs of electrostatic plates 25 and 26 placed in quadrature with each other. The electrostatic field between plates 25 effect a horizontal deflection to the beam, and plates 26 effect a vertical deflection to the beam. While either electromagnetic or electrostatic means may be used to deflect the electron beam to predetermined locations on the screen, the present invention contemplates the use of electrostatic plates. Deflection of the electron beam by electrostatic fields has the advantage over electromagnetic deflection in that the power requirements are smaller, the fields generated are capable of being controlled with substantially no interference from adjoining fields and the intensity of the fields may be changed more quickly than electro-magnetic fields thereby permitting a more rapid positioning of the beam. The inductance of electromagnetic coils causes a long L–R time constant which increases the time interval between serial deflections of the beam. Electrostatic deflection has the disadvantage of distorting the electron beam during the process of deflecting it. The amount of this distortion normally increases with an increase in the cross sectional dimensions of the electron beam. Also, the magnitude of this distortion increases with an increase in the angle of desired deflection.

Shaped beam cathode ray tubes exemplify the need for utilizing the advantages of electrostatic deflection without its accompanying disadvantages. However, the aforesaid distortion disadvantage is present to an excessive degree in tubes of this type inasmuch as the character shaped beam has a larger than ordinary cross section and is particularly subject to the effect of distortion. The present invention permits the use of electrostatic deflection plates in shaped beam cathode ray tubes with the distortion effect substantially reduced.

Lens elements 22 and 23 may be of electrostatic or electromagnetic type. Illustrated in FIGURE 2 of the specific embodiment, a pair of cylindrical electrostatic discs 22 and 23 are shown, each of which are capable of separately focusing the electron beam 18 in a single respective dimension. Lens element 22 consists of disc 28, having a slot 29 therein and lens element 23 consists of disc 30 having a slot 31 therein. Lens 22 receives the shaped beam 18 within its slot 29 and through its electrostatic field focuses the beam in its horizontal dimension causing the beam to be focused to a point in the horizontal plane at the center point of deflection of electrostatic plates 25. Lens element 23 also receives the shaped beam within its slot 31 and focuses the beam in its vertical dimension causing the beam to be focused to a point in the vertical plane at the center point of deflection in vertical deflection plates 26. It is readily apparent that lens elements 22 and 23 cause the electron beam to present its smallest dimension to each of the respective deflection fields of plates 25 and 26 thereby permitting the respective fields to deflect the beam at the point of its smallest dimension. Accordingly, the diverging of the individual electron by the electrostatic field is kept to a minimum.

In electron optics the equation $M=K^{Q}/_{P}$ is applicable where M is the magnification, Q is the lens to image distance, P is the object to lens distance and K is a constant and may be ignored for the purposes of this explanation. Referring to FIGURE 1, the distance $F_H$ is that focal length of lens element 22 required to focus the electron beam to a point in the horizontal dimension at the center of deflection of horizontal deflection plates 25. The distance $F_V$ is that focal length of lens element 23 required to focus the electron beam to a point in the vertical dimension at the center of deflection of vertical deflection plates 26. The cross over control unit permits the voltage to lens elements 22 and 23 to be varied thereby permitting adjustment of the exact length of the respective focal lengths.

The magnification of the character image displayed on the tube screen 27 over the size of the character aperture in matrix 16 is determined by the aforesaid equation $M=K^{Q}/_{P}$. Applying this equation to FIGURE 1, it is obvious that $$\frac{QH}{PH}$$

will give a larger magnification than will $$\frac{QV}{PV}$$

QH is larger than QV and PH is smaller than PV. Therefore, when using the focusing lenses 21, a larger magnification of the character image will occur in the horizontal plane than in the vertical plane. This difference in magnification alters the aforesaid aspect ratio of the character image. To maintain the correct 3 to 4 aspect ratio for the character image, the character aperture in the matrix is varied accordingly. In FIGURE 3*a*, a character aperture 33 in a matrix 32 is shown with the correct 3 to 4 aspect ratio that may be used to give the desired aspect ratio to the character image displayed on the tube screen when focusing means 21 is not used. In FIGURE 3*b*, a charatcer aperture 35 is shown in matrix 34 with a 2 to 4 aspect ratio. This aspect ratio will give the correct aspect ratio of 3 to 4 for the character image display on the tube screen when the focusing means 21 has sufficient strength. The ratio of 2 to 4 as shown in FIGURE 3*b* is illustrative only. Since the amount of correction to be incorporated in the aspect ratio of the character apertures in the matrix is dependent upon the final effect of the focusing means 21. Also, the desired aspect ratio can be 3 to 4 or any other desired ratio. However, in printed copy the normal aspect ratio is 3 to 4.

The particular embodiments of the invention illustrated and described herein are illustrative only and the invention includes such other modifications and equivalents as may readily appear to those skilled in the art, within the scope of the appended claims.

I claim:

1. In a cathode ray tube, means including an electron gun and a beam shaping member for generating and projecting a shaped electron beam toward an electro-responsive screen, said shaped beam having mutually perpendicular dimensions, first and second shaped mutually perpendicular deflection means for deflecting said beams to selected positions on said screen, said first and second deflection means each having a center of deflection, and first and second electron focusing lenses corresponding to said first and second deflection means respectively, said focusing lenses being positioned between said generating and projecting means and the corresponding deflection means, each of said focusing lenses having a focal length dependent upon the magnitude of a seperately applied fixed voltage, said first focusing lens having a focal length equal to the distance between said first focusing lens and the center of deflection of said first deflection means, said second focusing lens having a focal length equal to the distance between said second focus lens and the center of deflection of said second deflection means.

2. In a cathode ray tube as described in claim 1 wherein said electron lenses each have its object located at said beam shaping member and its image located at said electro-responsive screen.

3. In a cathode ray tube as described in claim 1 wherein each deflection means comprises a pair of electrostatic plates.

4. In a cathode ray tube, means including an electron gun and a beam shaping member for generating and projecting a shaped electron beam toward an electro-responsive screen, said shaped beam having horizontal and vertical dimensions, horizontal and vertical deflection means for deflecting said beam to selected positions on said screen, said horizontal and vertical deflection means each having a center of deflection, and horizontal and vertical electron focusing lenses positioned between said generating and projecting means and corresponding deflection means, each of said focusing lenses having a focal length dependent upon the magnitude of a separately applied fixed voltage, said horizontal focusing lens having a focal length equal to the distance between said horizontal focusing lens and the center of deflection of said horizontal deflection means whereby said beam is focused in a horizontal plane at the center of said horizontal deflection means, said vertical focusing lens having a focal length equal to the distance between said vertical focusing lens and the center of deflection of said vertical deflection means whereby said beam is focused in a vertical plane at the center of deflection of said vertical deflection means.

5. In a cathode ray tube as described in claim 4, wherein said electron lenses each have its object located at said beam shaping member.

References Cited in the file of this patent

UNITED STATES PATENTS

| | | |
|---|---|---|
| 1,779,794 | Ackermann | Oct. 28, 1930 |
| 2,728,872 | Smith | Dec. 27, 1955 |
| 2,769,116 | Koda et al. | Oct. 30, 1956 |
| 2,824,250 | McNaney et al. | Feb. 18, 1958 |
| 2,884,559 | Cooper et al. | Apr. 28, 1959 |